(12) United States Patent
Ahn et al.

(10) Patent No.: US 9,310,208 B2
(45) Date of Patent: Apr. 12, 2016

(54) MOBILE DEVICE FOR ESTIMATING LOCATION USING PARTICLE FILTER GENERATED BASED ON THREE-DIMENSIONAL (3D) MAGNETIC FIELD MAP AND METHOD USING SAID MOBILE DEVICE

(71) Applicant: SAMSUNG ELECTRONICS CO., LTD., Suwon-si (KR)

(72) Inventors: Hyun Gi Ahn, Incheon (KR); Ji Hyun Yoon, Yongin-si (KR); Seong Eun Kim, Suwon-si (KR); Yong Kim, Seoul (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 14/090,439

(22) Filed: Nov. 26, 2013

(65) Prior Publication Data

US 2014/0162703 A1 Jun. 12, 2014

(30) Foreign Application Priority Data

Nov. 26, 2012 (KR) ........................ 10-2012-0134779

(51) Int. Cl.
*H04W 24/00* (2009.01)
*G01C 21/20* (2006.01)
*G01C 21/16* (2006.01)

(52) U.S. Cl.
CPC ............ *G01C 21/206* (2013.01); *G01C 21/165* (2013.01)

(58) Field of Classification Search
None
See application file for complete search history.

(56) References Cited

U.S. PATENT DOCUMENTS

| 6,502,037 | B1 | 12/2002 | Jorgensen et al. | |
| 7,498,797 | B1 | 3/2009 | Olsson et al. | |
| 2006/0267833 | A1* | 11/2006 | Langford et al. | 342/174 |
| 2008/0077326 | A1* | 3/2008 | Funk et al. | 701/220 |
| 2012/0104150 | A1 | 5/2012 | Elgersma et al. | |
| 2012/0143495 | A1* | 6/2012 | Dantu | 701/428 |

FOREIGN PATENT DOCUMENTS

| KR | 2002-0043368 A | 6/2002 |
| KR | 10-2004-0046814 A | 6/2004 |
| KR | 10-2005-0063469 A | 6/2005 |
| KR | 10-2006-0053582 A | 5/2006 |
| KR | 10-2011-0079775 A | 7/2011 |
| WO | WO 2008/122905 A1 | 10/2008 |

* cited by examiner

*Primary Examiner* — Suhail Khan
(74) *Attorney, Agent, or Firm* — NSIP Law

(57) ABSTRACT

A mobile device includes a magnetic field sensor configured to measure a magnetic field value at a location of the mobile device, and a memory configured to store first magnetic field maps corresponding to a number N of respective heights. The mobile device includes a magnetic field map deriving unit configured to derive second magnetic field maps corresponding to a number M of respective heights based on the first magnetic field maps, the number M being greater than the number N, and a location determining unit configured to determine the location of the mobile device based on the magnetic field value and the second magnetic field maps.

15 Claims, 13 Drawing Sheets

MOBILE DEVICE FOR ESTIMATING LOCATION USING PARTICLE FILTER GENERATED BASED ON THREE-DIMENSIONAL (3D) MAGNETIC FIELD MAP AND METHOD USING SAID MOBILE DEVICE

CROSS-REFERENCE TO RELATED APPLICATION

This application claims the benefit under 35 USC 119(a) of Korean Patent Application No. 10-2012-0134779, filed on Nov. 26, 2012, in the Korean Intellectual Property Office, the entire disclosure of which is incorporated herein by reference for all purposes.

BACKGROUND

1. Field

The following description relates to a mobile device for estimating a location using a particle filter generated based on a three-dimensional (3D) magnetic field map, and a method using the mobile device.

2. Description of Related Art

With the spread of smart phones, a demand exists for location estimation technologies for providing a location-based service (LBS) in various areas. In particular, three technologies for estimating a location in an indoor environment are commercialized. The three technologies include a location estimating method using a mobile communication signal, a location estimating method using a wireless local area network (WLAN), and a location estimating method using an ultra wideband (UWB).

In the method using the mobile communication signal, a mobile device may approximate a location of the mobile device to a location of a cell base station to which the mobile device is connected, and/or perform triangulation by measuring times of arrival (TOAs) of signals received from at least three proximate base stations, thereby estimating the location of the mobile device. In the method using the WLAN, a mobile device (e.g., a WLAN terminal) may approximate a location of the mobile device to a location of an access point (AP) to the mobile device is related, and/or measure a signal intensity of a proximate AP and perform pattern matching between the measured signal intensity and a fingerprinted map previously recorded, thereby estimating the location of the mobile device. In the method using the UWB, a mobile device may perform triangulation by measuring distances from APs generating UWB signals, thereby estimating a location of the mobile device.

SUMMARY

In one general aspect, there is provided a mobile device including a magnetic field sensor configured to measure a magnetic field value at a location of the mobile device, and a memory configured to store first magnetic field maps corresponding to a number N of respective heights. The mobile device further includes a magnetic field map deriving unit configured to derive second magnetic field maps corresponding to a number M of respective heights based on the first magnetic field maps, the number M being greater than the number N, and a location determining unit configured to determine the location of the mobile device based on the magnetic field value and the second magnetic field maps.

In another general aspect, there is provided a method including obtaining first magnetic field maps corresponding to a number N of respective heights, and deriving second magnetic field maps corresponding to a number M of respective heights based on the first magnetic field maps, the number M being greater than the number N. The second magnetic field maps are used to determine a location of a mobile device.

In still another general aspect, there is provided a mobile device including a magnetic field sensor configured to measure a magnetic field value at a location of the mobile device, and a memory configured to store a first magnetic field map and a second magnetic field map. The mobile device further includes a location determining unit configured to determine the location of the mobile device based on the magnetic field value, the first magnetic field map, and the second magnetic field map.

Other features and aspects will be apparent from the following detailed description, the drawings, and the claims.

DETAILED DESCRIPTION

Figure 1:
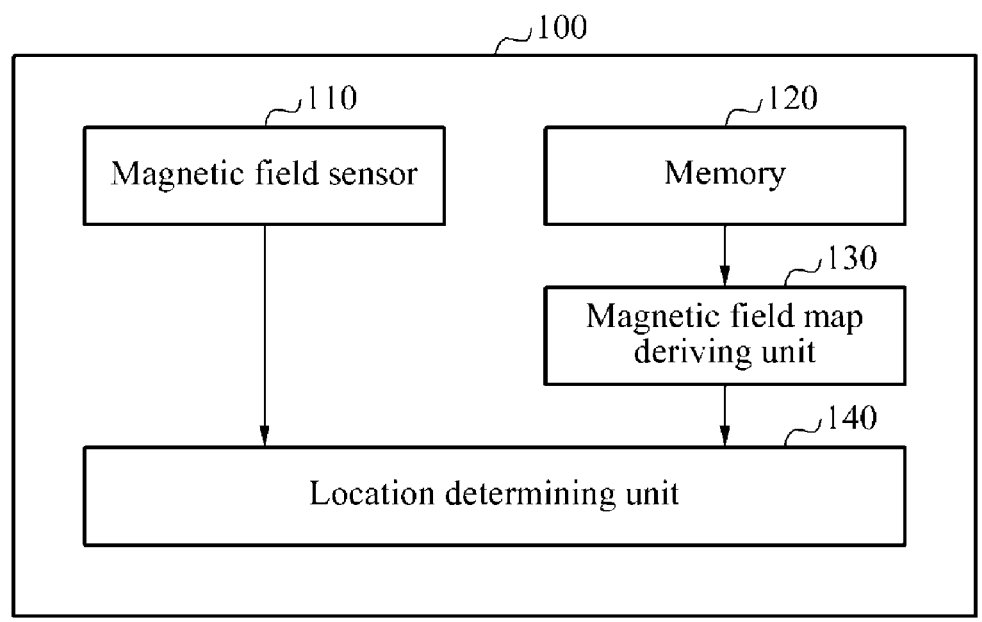
FIG. 1 is a block diagram illustrating an example of a mobile device that estimates a location based on a magnetic field map.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a mobile device 100 that estimates a location based on a magnetic field map. Referring to FIG. 1, the mobile device 100 includes a magnetic field sensor 110, a memory 120, a magnetic field map deriving unit 130, and a location determining unit 140.

The magnetic field sensor 110 measures a magnetic field value at a location of the mobile device 100. As to be described in detail below, the location determining unit 140 estimates the location of the mobile device 100 based on the magnetic field value measured by the magnetic field sensor 110.

In more detail, the location determining unit 140 estimates the location of the mobile device 100 based on the magnetic field value measured by the magnetic field sensor 110, and a magnetic field map including magnetic field values at respective locations. The magnetic field values at the respective locations may be provided in advance. The locations may be on a two-dimensional (2D) plane, and/or in a three-dimensional (3D) space. The location determining unit 140 may use multiple magnetic field maps corresponding to respective heights.

For example, the location determining unit 140 may search the magnetic field map for a location at which a magnetic field value is most similar to the magnetic field value measured by the magnetic field sensor 110. In this example, the mobile device 100 may perform pattern matching between the measured magnetic field value and the magnetic field values included in the magnetic field map, thereby searching for the location at which the magnetic field value is most similar to the measured magnetic field value.

The memory 120 stores first magnetic field maps corresponding to a number N of respective heights. In this example, N may be a positive integer greater than or equal to 2.

For example, the first magnetic field maps may include a magnetic field map A corresponding to a height h_a, and a magnetic field map B corresponding to a height h_b. The magnetic field map A may include magnetic field values measured in advance at respective locations on a 2D plane corresponding to the height h_a, and the magnetic field map B may include magnetic field values measured in advance at respective locations on a 2D plane corresponding to the height h_b.

The magnetic field values included in the magnetic field map A may differ from the magnetic field values included in the magnetic field map B. For example, the height h_a may be about 50 centimeters (cm) from a floor of a predetermined story (for example, a third story) of a predetermined building, and the height h_b may be about 1 meter (m) from the floor of the same predetermined story of the same predetermined building. Although the magnetic field values are measured on the same predetermined story of the same predetermined building, the magnetic field values measured at the height h_a may differ from the magnetic field values measured at the height h_b. Accordingly, the mobile device 100 may use a 3D magnetic field map rather than a 2D magnetic field map to increase an accuracy of location estimation.

The magnetic field map deriving unit 130 derives second magnetic field maps corresponding to a number M of respective heights, based on the first magnetic field maps stored in the memory 120. In this example, N may be a value greater than M. For example, the magnetic field map deriving unit 130 may derive the second magnetic field maps corresponding to the respective heights more segmented than the heights corresponding to the respective first magnetic field maps stored in the memory 120.

The location determining unit 140 determines the location of the mobile device 100 based on the magnetic field value measured by the magnetic field sensor 110, and the second magnetic field maps. Since the second magnetic field maps may include more segmentalized information when compared to the first magnetic field maps, the mobile device 100 may increase the accuracy of the location estimation in comparison to a mobile device that only stores magnetic field maps. An operation of the magnetic field map deriving unit 130 and an operation of the location determining unit 140 will be further described in detail with reference to FIGS. 2 and 3, respectively.

The mobile device 100 may download a location estimation application over a network. The mobile device 100 may further download the first magnetic field maps over the network.

For example, the mobile device 100 may download, in advance, the first magnetic field maps to estimate the location of the mobile device 100 in a predetermined building. In this example, the first magnetic field maps may be 3D magnetic field maps of the predetermined building. The mobile device 100 may store the downloaded first magnetic field maps in the memory 120, and may retrieve the first magnetic field maps from the memory 120 when the location is to be estimated. The mobile device 100 may derive the second magnetic field maps based on the first magnetic field maps, and may estimate the location based on the second magnetic field maps. Accordingly, the mobile device 100 may increase an efficiency of a storage space when compared to storing the second magnetic field maps in the memory 120.

As another example, the mobile device 100 may receive, from a server in real time, the first magnetic field maps, for example, 3D magnetic field maps of a predetermined building. The mobile device 100 may temporarily store the received first magnetic field maps in the memory 120, and may retrieve the first magnetic field maps from the memory 120 when the location is to be estimated. The mobile device 100 may derive the second magnetic field maps based on the first magnetic field maps, and may estimate the location based on the second magnetic field maps. The mobile device 100 may delete the temporarily-stored first magnetic field maps from the memory 120 when the estimation of the location is completed. Accordingly, the mobile device 100 may reduce a volume of data to be received from the server when compared to receiving the second magnetic field maps from the server in real time.

Figure 2:
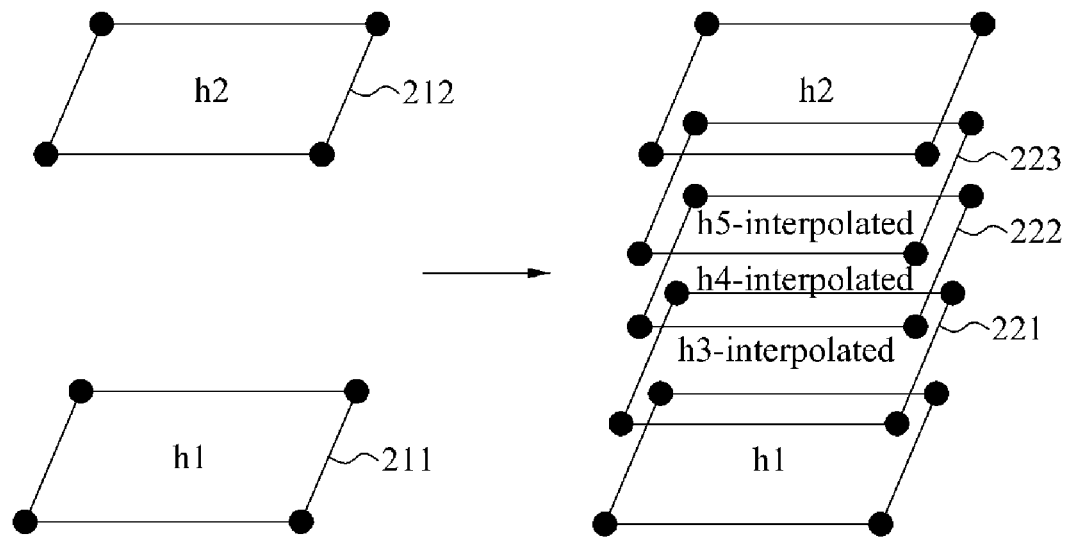
FIG. 2 is a diagram illustrating an example of an operation of a magnetic field map deriving unit.

FIG. 2 illustrates an example of an operation of a magnetic field map deriving unit. Referring to FIG. 2, the magnetic field map deriving unit (e.g., 130 of FIG. 1) derives second magnetic field maps corresponding to a number M of respective heights, based on first magnetic field maps corresponding to a number N of respective heights. In this example, M is a value greater than N.

For example, the first magnetic field maps include a magnetic field map 211 corresponding to a height h1, and a magnetic field map 212 corresponding to a height h2. The mobile device derives or interpolates the second magnetic field maps including a magnetic field map 221, a magnetic field map 222, and a magnetic field map 223, based on the magnetic field map 211 and the magnetic field map 212. The magnetic field map 221 corresponds to a height h3, the magnetic field map 222 corresponds to a height h4, and the magnetic field map 223 corresponds to a height h5. In addition, the heights h3, h4, and h5 are positioned between the height h1 and the height h2. That is, the magnetic field map deriving unit derives the second magnetic field maps corresponding to the respective heights between the height h1 and the height h2 based on the magnetic field map 211 corresponding to the height h1 and the magnetic field map 212 corresponding to the height h2. The magnetic field map deriving unit may further derive second magnetic field maps corresponding to the respective heights lower than the height h1, and/or corresponding to the respective heights higher than the height h2.

Figure 3:
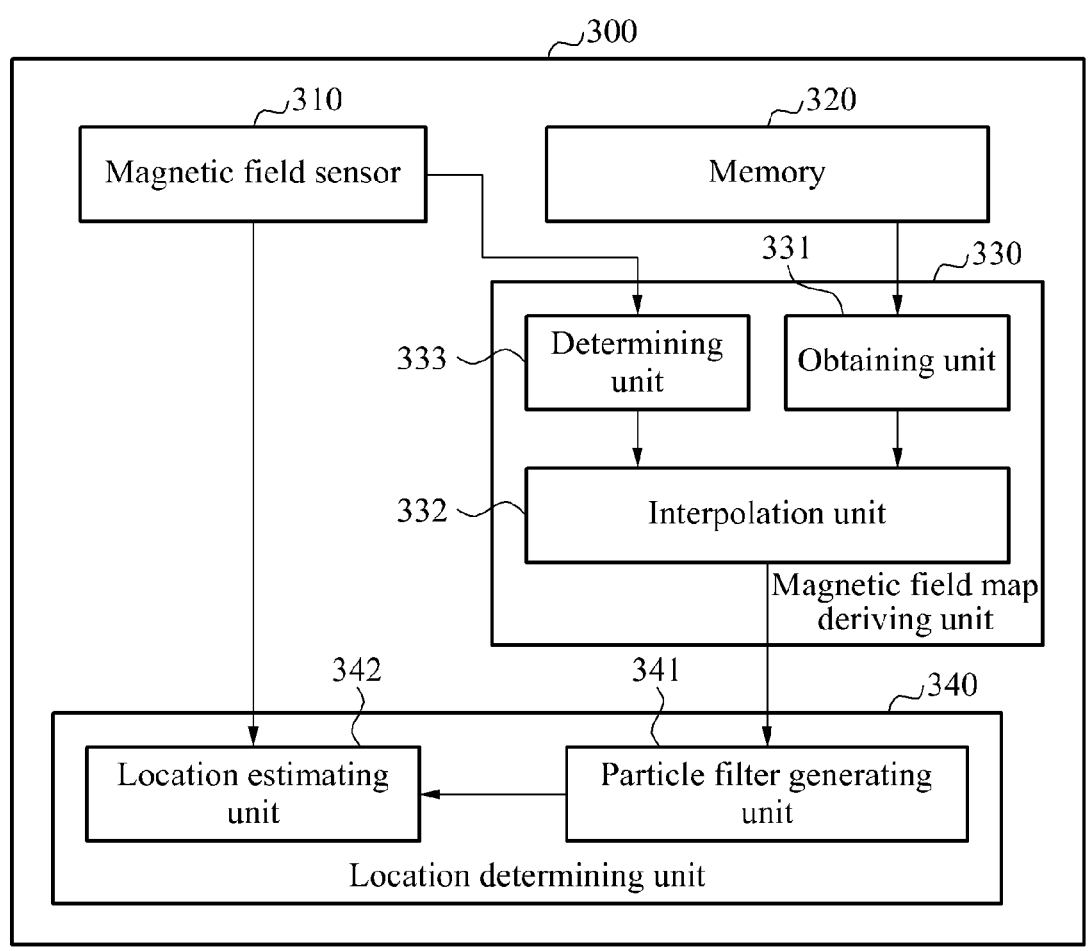
FIG. 3 is a block diagram illustrating another example of a mobile device that estimates a location based on a magnetic field map.

FIG. 3 illustrates another example of a mobile device 300 that estimates a location based on a magnetic field map. Referring to FIG. 3, the mobile device 300 includes a magnetic field sensor 310, a memory 320, a magnetic field map deriving unit 330, and a location determining unit 340.

As described with reference to FIG. 1, the magnetic field sensor 310 measures a magnetic field value at the location of the mobile device 300. The memory 320 stores first magnetic field maps corresponding to a number N of respective heights.

The magnetic field map deriving unit 330 includes an obtaining unit 331, an interpolation unit 332, and a determining unit 333. The obtaining unit 331 obtains the first magnetic field maps from the memory 320. For example, the obtaining unit 331 may obtain, from the memory 320, a magnetic field map A and a magnetic field map B that are included in the first magnetic field maps. The magnetic field map A may correspond to a height h_a, and the magnetic field map B may correspond to a height h_b.

The interpolation unit 332 interpolates the first magnetic field maps to derive a number M of second magnetic field maps. In this example, M is a value greater than N. For example, the interpolation unit 332 may derive, among the second magnetic field maps, a magnetic field map C corresponding to a height h_c and positioned between the height h_a and the height h_b. As described with reference to FIG. 2, multiple magnetic field maps, among the second magnetic field maps, may be derived and positioned between the height h_a and the height h_b. The second magnetic field maps may include the derived magnetic field map C, and the magnetic field maps A and B that are included in the first magnetic field maps.

The determining unit 333 determines the value of M based on a resolution of the magnetic field sensor 310. The resolution of the magnetic field sensor 310 may include a difference between heights at which respective magnetic field values are measured. The resolution of the magnetic field sensor 310 may further include an indicator indicating a degree of accuracy of the magnetic field values to be measured, which may include, for example, a minimum measurement unit corresponding to a predetermined error tolerance, e.g., about 1 microtesla (µT).

For example, if the difference between the heights at which respective magnetic field values are measured is about 0.2 meters (m), the magnetic field sensor 310 may measure the magnetic field values at the respective heights between which the difference is within about 0.2 m. The magnetic field sensor 310 may further measure the magnetic field values within the predetermined error tolerance, for example, about 1 µT, in practice. Accordingly, distinguishing the magnetic field values may be difficult.

In this example, the determining unit 333 may determine the value of M so that the second magnetic field maps are derived at respective heights between which the difference is within about 0.2 m. In more detail, the magnetic field map A may correspond to a height of about 0.5 m from a floor of a predetermined story (for example, a third story) of a predetermined building, and the magnetic field map B may correspond to a height of about 1.5 m from the floor of the same predetermined story of the same predetermined building. The determining unit 333 may determine the value of M to be 6 so that the interpolation unit 332 is to derive the second magnetic field maps corresponding to heights of about 0.7 m, 0.9 m, 1.1 m, and 1.3 m, respectively, from the floor of the same predetermined story of the same predetermined building. Two of the six second magnetic field maps, namely, the magnetic field maps A and B, are included in the first magnetic field maps, and the remaining four of the six second magnetic field maps are newly derived by the interpolation unit 332 and positioned between the magnetic field maps A and B.

As another example, the determining unit 333 may determine the value of M based on a relative location of a magnetic field map to be newly derived, in addition to the resolution of the magnetic field sensor 310. The relative location of the magnetic field map to be newly derived may be between the magnetic field map A and the magnetic field map B that are included in the first magnetic field maps, lower than the magnetic field map A, or higher than the magnetic field map B.

As described above, if the magnetic field sensor 310 measures the magnetic field values with the resolution of about 0.2 m, the determining unit 333 may determine the value of M so that the second magnetic field maps are derived at respective heights between which the difference is within about 0.2 m. For example, the magnetic field map A may correspond to a height of about 0.5 m from a floor of a predetermined story (for example, a third story) of a predetermined building, and the magnetic field map B may correspond to a height of about 1.5 m from the floor of the same predetermined story of the same predetermined building. In this example, a height corresponding to the magnetic field map to be newly derived may not be limited to between the height corresponding to the magnetic field map A and the height corresponding to the magnetic field map B. The determining unit 333 may determine the value of M to be 8 so that so that the interpolation unit 332 is to derive the second magnetic field maps corresponding to heights of about 0.7 m, 0.9 m, 1.1 m, and 1.3 m, respectively, and corresponding to heights of about 0.3 m and 1.7 m, respectively, from the floor of the same predetermined story of the same predetermined building. Two of the eight second magnetic field maps, namely, the magnetic field maps A and B, are included in the first magnetic field maps, and the remaining six of the eight second magnetic field maps are newly derived by the interpolation unit 332.

The location determining unit 340 includes a particle filter generating unit 341 and a location estimating unit 342. The particle filter generating unit 341 generates a particle filter based on the second magnetic field maps. The particle filter may include a type of probability-based reasoning. The particle filter receives a magnetic field value measured by the magnetic field sensor 310, and outputs the location of the mobile device 300.

The location estimating unit 342 estimates the location of the mobile device 300 based on the particle filter generated by the particle filter generating unit 341, and the magnetic field value measured by the magnetic field sensor 310. Since the second magnetic field maps include more segmented information when compared to the first magnetic field maps, the particle filter generated based on the second magnetic field maps may be more accurate than a particle filter generated based on the first magnetic field maps. Accordingly, the location estimating unit 342 may estimate the location of the mobile device 300 more accurately when compared to estimating the location simply based on the first magnetic field maps.

Figure 4:
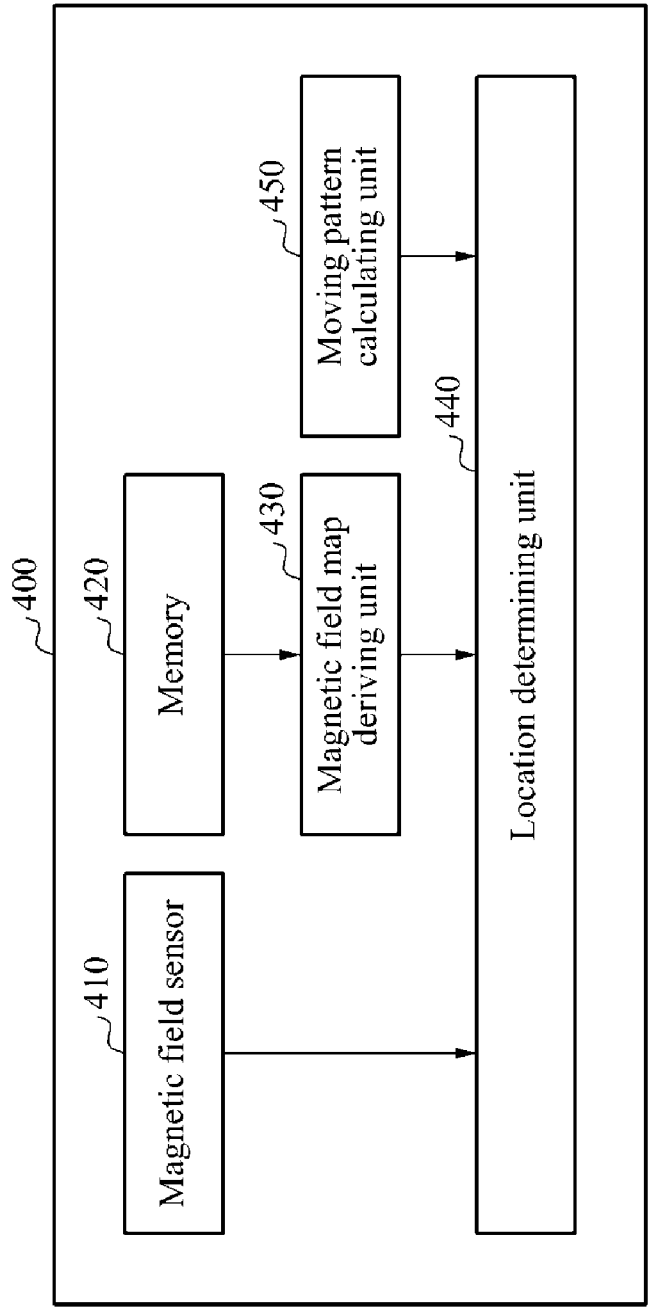
FIG. 4 is a block diagram illustrating an example of a mobile device that estimates a location based on a magnetic field map and a moving pattern.

FIG. 4 illustrates an example of a mobile device 400 that estimates a location based on a magnetic field map and a moving pattern. Referring to FIG. 4, the mobile device 400 includes a magnetic field sensor 410, a memory 420, a magnetic field map deriving unit 430, and a location determining unit 440. The mobile device 400 further includes a moving pattern calculating unit 450.

The moving pattern calculating unit 450 calculates a moving pattern of the mobile device 400. The location determining unit 440 estimates the location of the mobile device 400 additionally based on the moving pattern of the mobile device 400. For example, the moving pattern may include a moving pattern of going around a corner of a hallway in a building, a moving pattern of going up and down a flight of stairs, a moving pattern of going up and down using an elevator, and/or a moving pattern of entering a hallway from the stairs or the elevator.

Figure 5A:
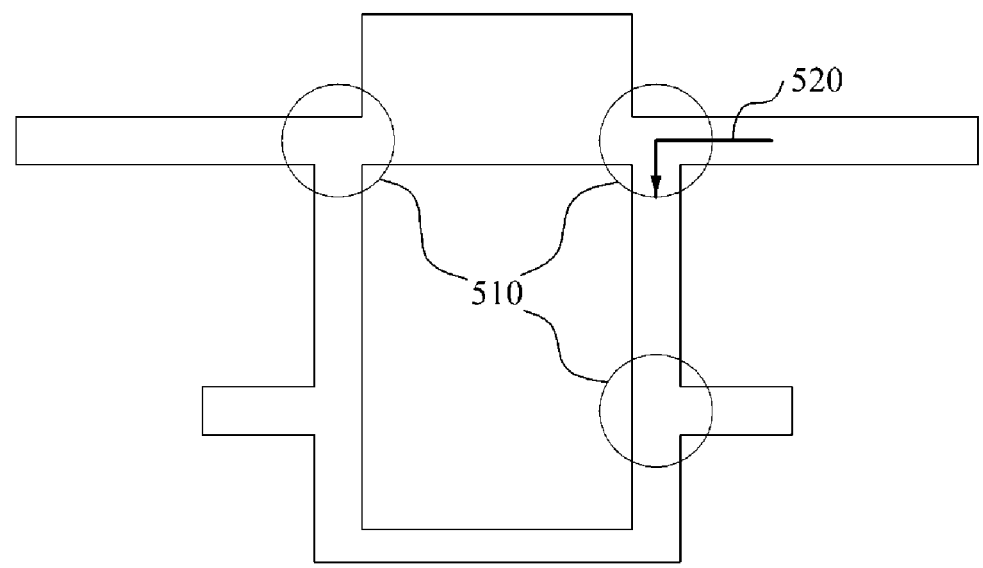
FIGS. 5A and 5B are diagrams illustrating examples of an operation of a location determining unit.
Figure 5B:
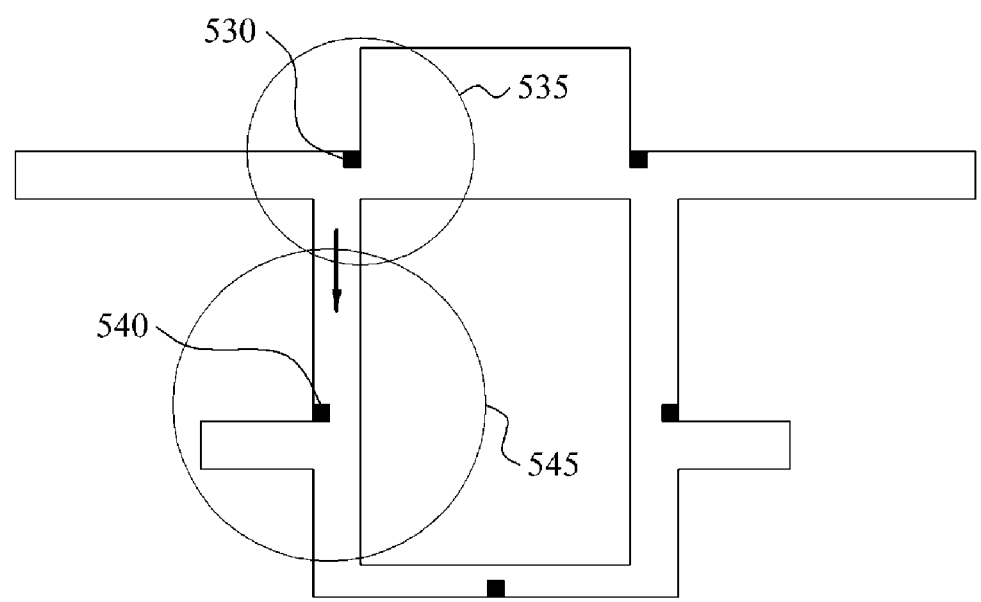

The mobile device 400 may obtain information of an initial location of the mobile device 400 to be used to estimate the location of the mobile device 400, based on the moving pattern, as described with further reference to FIGS. 5A and 5B.

FIGS. 5A and 5B illustrate examples of an operation of a location determining unit. For example, referring to FIG. 5A, the location determining unit (e.g., 440 of FIG. 4) may restrict initial location candidates 510 of a mobile device (e.g., 400 of FIG. 4), based on a moving pattern 520 of the mobile device on a floor plan of a building. The floor plan of the building may include at least one story of heights corresponding to respective first magnetic field maps. The floor plan of the building may further include feature points of a building structure, for example, locations of corners, flights of stairs, and/or an elevator in the building.

For example, the moving pattern 520 of going straight, making a 90-degree turn to the left, and going straight may be sensed. The location determining unit may exclude, from the initial location candidates 510, one or more locations other than passages turning to the left at 90 degrees based on the floor plan of the building and the moving pattern 520.

Furthermore, when an upper portion of FIG. 5A corresponds to a northern direction, the location determining unit may sense the moving pattern 520 of going west, making a 90-degree turn, and going south. The location determining unit may restrict the initial location candidates 510 at which the mobile device may be positioned initially, to three corners (e.g., an upper right one of the initial location candidates 510) based on the moving pattern 520.

Accordingly, the location determining unit may use second magnetic field maps generated by a magnetic field map deriving unit (e.g., 430 of FIG. 4), and the moving pattern calculated by a moving pattern calculating unit (e.g., 450 of FIG. 4), thereby increasing an accuracy of location estimation. That is, the location determining unit may determine the location of the mobile device based on the second magnetic field maps and the remaining initial location candidates 510.

Referring to FIG. 5B, a floor plan of a building may include feature points related to a wireless signal being received, for example, a transition point of an access point (AP) providing wireless-fidelity (WiFi) in the building, a cellular handover point, and/or other points known to one of ordinary skill in the art. The location determining unit may restrict initial location candidates of the mobile device based on a moving pattern of the mobile device on the floor plan of the building.

For example, the mobile device may enter a coverage area 545 of an AP 540 from a coverage area 535 of an AP 530. Based on the moving pattern of the mobile device on the floor plan of the building, the mobile device 400 may exclude, from the initial location candidates, one or more locations other than those within a boundary of the coverage area 535 of the AP 530 and other than those within a boundary of the coverage area 545 of the AP 540.

Referring again to FIG. 4, the descriptions provided with reference to FIGS. 1 through 3 may be applied identically to the magnetic field sensor 410, the memory 420, the magnetic field map deriving unit 430, and the location determining unit 440, and thus, a repeated description will be omitted for conciseness. The moving pattern calculating unit 450 and the location determining unit 440 will be further described in detail with reference to FIG. 6.

Figure 6:
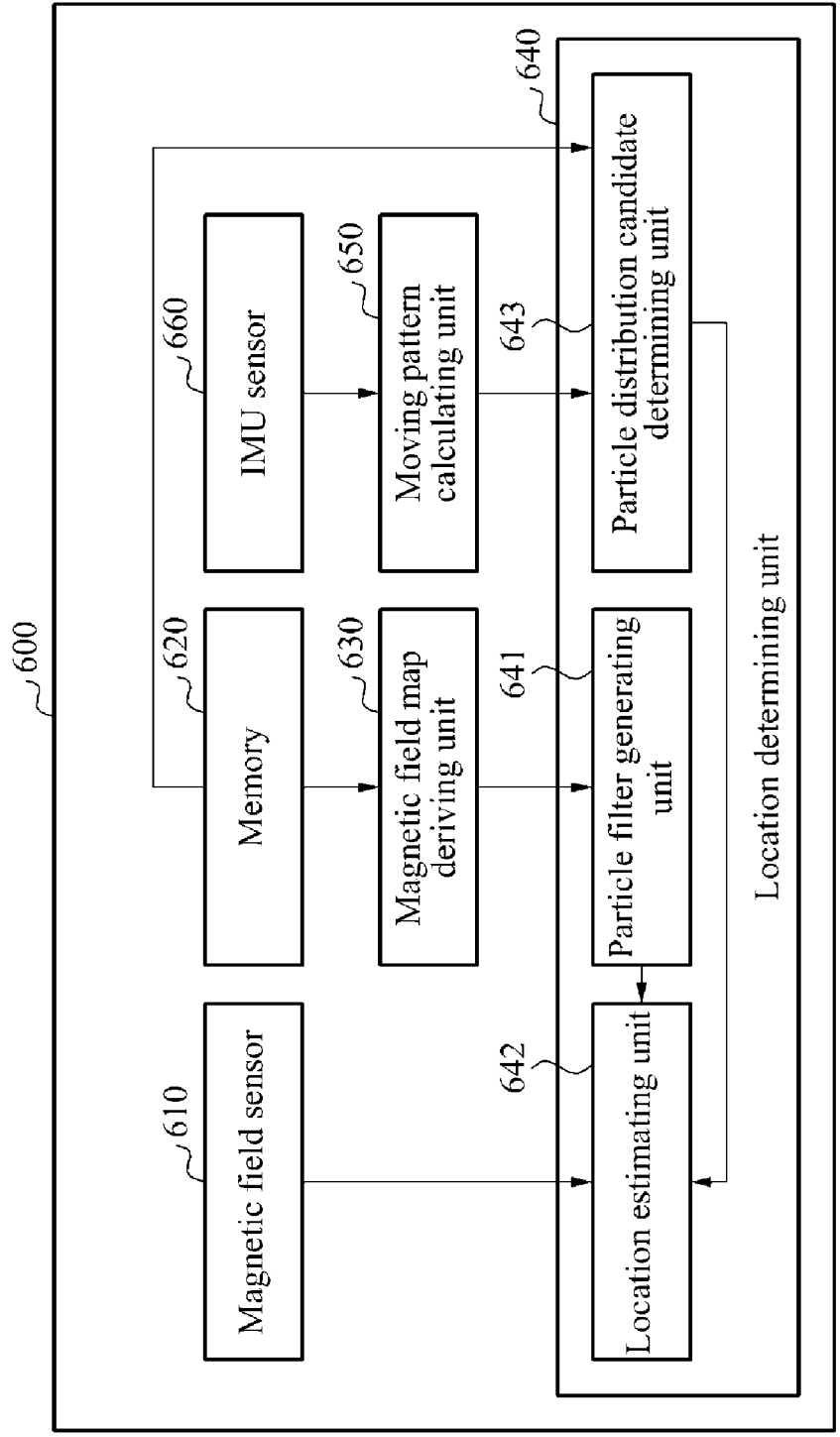
FIG. 6 is a block diagram illustrating another example of a mobile device that estimates a location based on a magnetic field map and a moving pattern.

FIG. 6 illustrates another example of a mobile device 600 that estimates a location based on a magnetic field map and a moving pattern. Referring to FIG. 6, the mobile device 600 include a magnetic field sensor 610, a memory 620, a magnetic field map deriving unit 630, a location determining unit 640, and a moving pattern calculating unit 650. The mobile device 600 further includes an inertial measurement unit (IMU) sensor 660.

The IMU sensor 660 measures an acceleration and a gyro of the mobile device 600. The gyro may include a rotation and/or an orientation of the mobile device 600.

The moving pattern calculating unit 650 calculates a moving pattern of the mobile device 600 based on the acceleration and the gyro that are measured by the IMU sensor 660. For example, the moving pattern calculating unit 650 may determine whether the mobile device 600 is moving based on the acceleration. In addition, the moving pattern calculating unit 650 may determine whether the mobile device 600 rotates based on the gyro. The moving pattern calculating unit 650 may recognize that the mobile device 600 goes around a corner based on a determination that the mobile device 600 goes straight (e.g., accelerates), turns (e.g., rotates), and goes straight.

Although not shown in FIG. 6, as another example, the moving pattern calculating unit 650 may calculate the moving pattern of the mobile device 600 based on azimuth information, in addition to the acceleration and the gyro. The moving pattern calculating unit 650 may obtain the azimuth information of a direction in which the mobile device 600 moves, for example, east, west, south, and/or north. The moving pattern calculating unit 650 may calculate the moving pattern of, e.g., moving west and then moving south, and the like, based on the azimuth information, the acceleration, and the gyro.

As still another example, the moving pattern calculating unit 650 may determine whether the mobile device 600 goes up and down a flight of stairs or an elevator, based on the acceleration value and the gyro value. In more detail, the moving pattern calculating unit 650 may determine the orientation of the mobile device 600 based on the orientation of the mobile device 600 included in the gyro. In addition, the moving pattern calculating unit 650 may determine accelerations of an x-axis, a y-axis, and a z-axis, respectively, based on the orientation and/or the acceleration of the mobile device 600, thereby determining whether the mobile device 600 goes up and down the flight of the stairs or an elevator. As yet another example, the moving pattern calculating unit 650 may determine whether the mobile device 600 enters a hallway from the stairs or the elevator.

The location determining unit 640 includes a particle filter generating unit 641, a location estimating unit 642, and a particle distribution candidate determining unit 643. The particle filter generating unit 641 generates a particle filter based on second magnetic field maps.

The memory 620 stores a floor plan of first magnetic field maps. The particle distribution candidate determining unit 643 determines a particle distribution candidate for the particle filter based on the moving pattern calculated by the moving pattern calculating unit 650 and the floor plan obtained from the memory 620. The particle distribution candidate for the particle filter may include one or more candidate areas in which the mobile device 600 may be positioned initially. The particle distribution candidate determining unit 643 may identify feature points of a building structure based on the floor plan, or features points related to a wireless signal being received, and may detect a feature point matching the moving pattern, among the identified feature points. The feature points of the building structure may include, for example, corners, flights of stairs, an elevator, and/or other features known to one of ordinary skill in the art. The feature points related to the wireless signal may include, for example, a change point of an AP, a cellular handover point, and/or other features known to one of ordinary skill in the art. The particle distribution candidate determining unit 643 may restrict (e.g., limit) the candidate areas in which the mobile device 600 may be positioned initially. The description provided with reference to FIGS. 5A and 5B may be applied identically to the particle distribution candidate determining unit 643, and thus, a repeated description will be omitted for conciseness.

The location estimating unit 642 estimates the location of the mobile device 600 based on the particle filter generated by the particle filter generating unit 641, the particle distribution candidate determined by the particle distribution candidate determining unit 643, and a magnetic field value measured by the magnetic field sensor 610.

The descriptions provided with reference to FIGS. 1 through 5B may be applied identically to the magnetic field sensor 610, the memory 620, the magnetic field map deriving unit 630, the location determining unit 640, and thus, a repeated description will be omitted for conciseness.

Figure 7A:
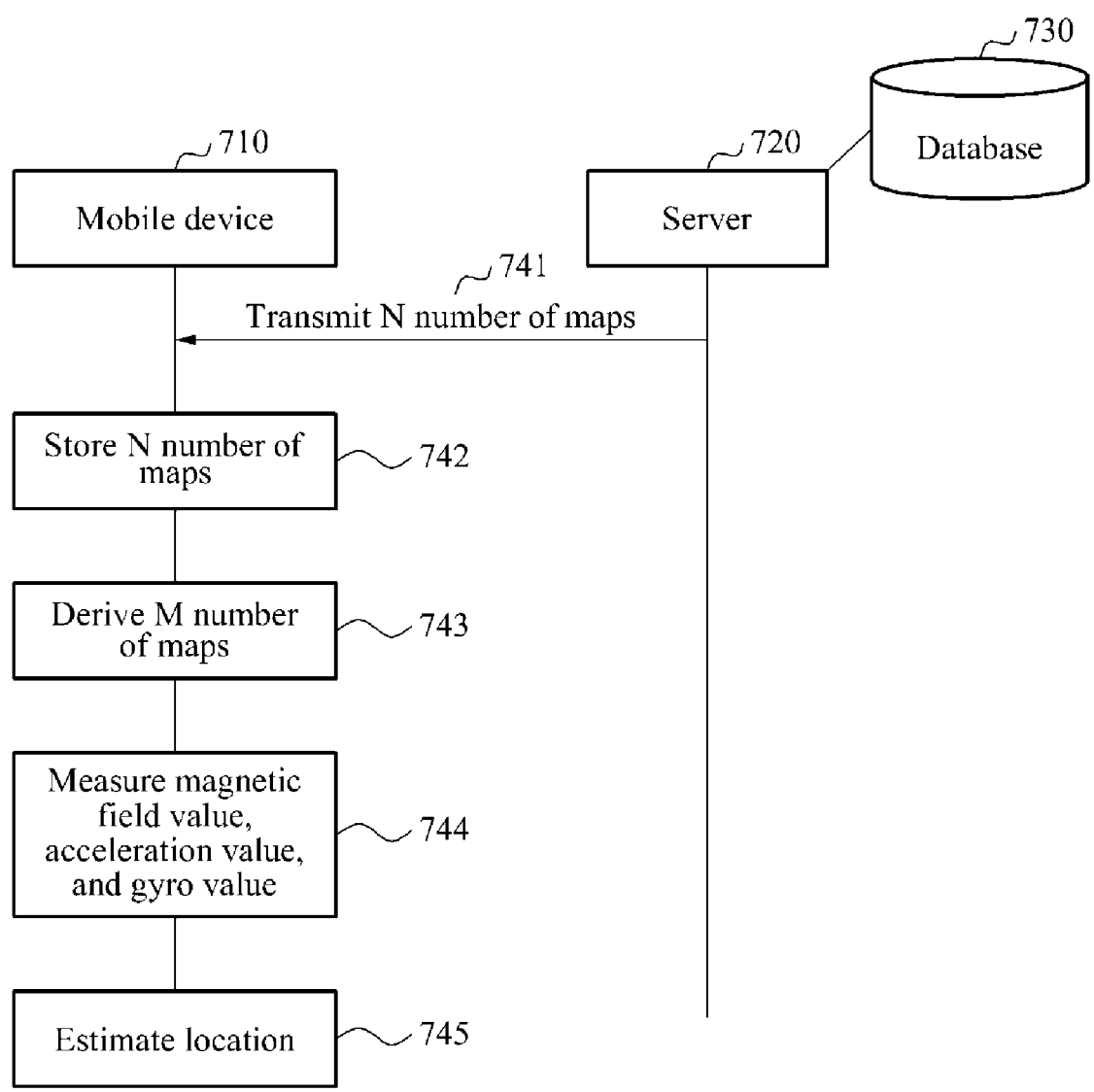
FIGS. 7A through 7C are flowcharts illustrating examples of a method of estimating a location based on a magnetic field map.
Figure 7B:
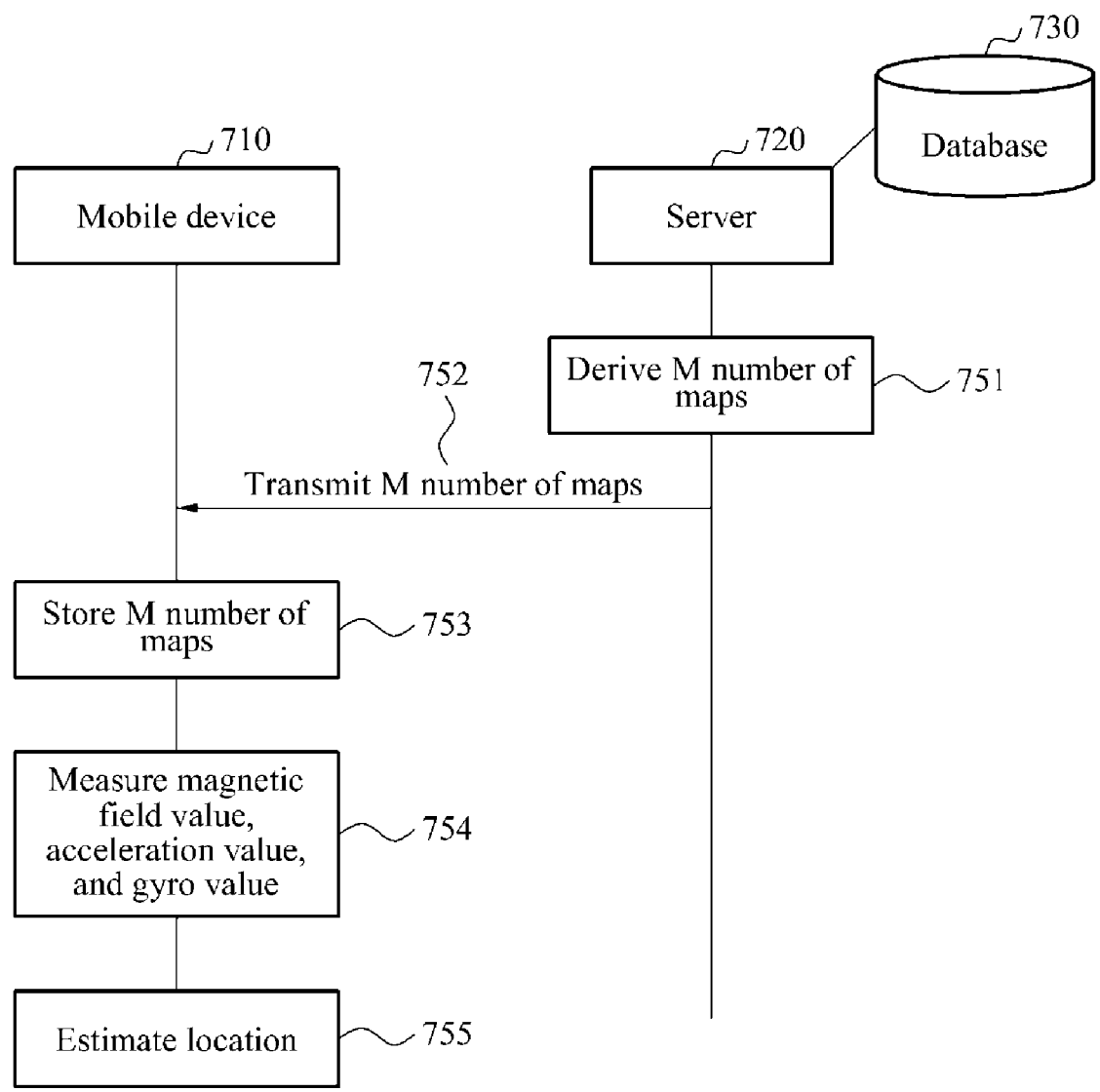
Figure 7C:
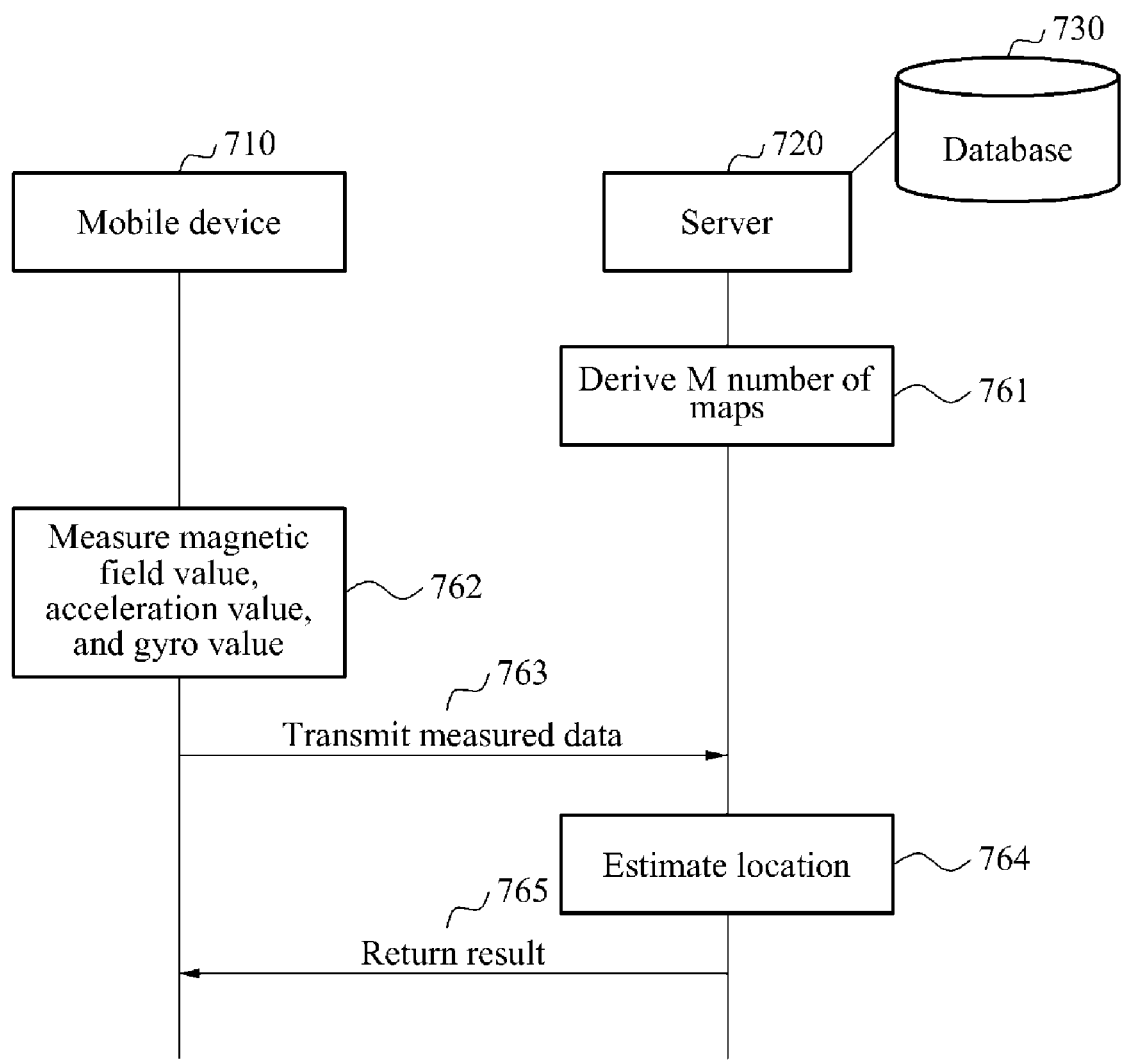

FIGS. 7A through 7C illustrate examples of a method of estimating a location based on a magnetic field map. Referring to FIG. 7A, a server 720 includes a database 730 that stores store a number N of first magnetic field maps.

In operation 741, the server 720 transmits, to a mobile device 710, the number N of the first magnetic field maps.

In operation 742, the mobile device 710 stores the number N of the first magnetic field maps received from the server 720. The mobile device 710 may store the number N of the first magnetic field maps in a non-volatile memory, and may use the number N of the first magnetic field maps continuously in future operations. As another example, the mobile device 710 may temporarily store the number N of the first magnetic field maps, and may delete the number N of the first magnetic field maps when the estimating of the location is completed.

In operation 743, the mobile device 710 derives a number M of second magnetic field maps based on the number N of magnetic field maps. In this example, M is a value greater than N. The mobile device 710 may interpolate the number N of the first magnetic field maps to derive the number M of the second magnetic field maps.

In operation 744, the mobile device 710 measures information to be used to estimate the location of the mobile device 710. For example, the mobile device 710 may measure a magnetic field value using a magnetic field sensor, may measure an acceleration value using an acceleration sensor, and may measure a gyro value using a gyro sensor.

In operation 745, the mobile device 710 estimates the location of the mobile device 710 based on the second magnetic field maps and the measured information. Although not shown in FIG. 7A, the mobile device 710 may calculate a moving pattern of the mobile device 710 based on the acceleration value, the gyro value, and/or other values discussed above. The mobile device 710 may estimate the location of the mobile device 710 more accurately based on the measured information, the second magnetic field maps, and the moving pattern.

Referring to FIG. 7B, in operation 751, the server 720 derives a number M of second magnetic field maps based on an number N of the first magnetic field maps stored in the database 730. In this example, M is a value greater than N. The server 720 may interpolate the number N of the first magnetic field maps to derive the number M of the second magnetic field maps.

In operation 752, the server 720 transmits, to the mobile device 710, the number M of the second magnetic field maps.

In operation 753, the mobile device 710 stores the number M of the second magnetic field maps received from the server 720. The mobile device 710 may store the number M of the second magnetic field maps in a non-volatile memory, and may use the number M of the second magnetic field maps continuously in future operations. As another example, the mobile device 710 may temporarily store the number M of the second magnetic field maps, and delete the number M of the second magnetic field maps when the estimating of the location is completed.

In operation 754, the mobile device 710 measures information to be used to estimate the location of the mobile device 710. For example, the mobile device 710 may measure a magnetic field value using a magnetic field sensor, may measure an acceleration value using an acceleration sensor, and may measure a gyro value using a gyro sensor.

In operation 755, the mobile device 710 estimates the location of the mobile device 710 based on the second magnetic field maps and the measured information. Although not shown in FIG. 7B, the mobile device 710 may calculate a moving pattern of the mobile device 710 based on the acceleration value, the gyro value, and/or other values discussed above. The mobile device 710 may estimate the location of the mobile device 710 more accurately based on the measured information, the second magnetic field maps, and the moving pattern.

Referring to FIG. 7C, in operation 761, the server 720 derives a number M of second magnetic field maps based on a number N of first magnetic field maps stored in the database 730. In this example, M is a value greater than N. The server 720 may interpolate the number N of the first magnetic field maps to derive the number M of the second magnetic field maps.

In operation 762, the mobile device 710 measures information to be used to estimate the location of the mobile device 710. For example, the mobile device 710 may measure a magnetic field value using a magnetic field sensor, may measure an acceleration value using an acceleration sensor, and may measure a gyro value using a gyro sensor.

In operation 763, the mobile device 710 transmits the measured information or data to the server 720.

In operation 764, the server 720 estimates the location of the mobile device 710 based on the measured information and the second magnetic field maps. In this example, the server 720 may calculate a moving pattern of the mobile device 710 based on the acceleration value, the gyro value, and/or other values discussed above that are received from the mobile device 710. Accordingly, the server 720 may estimate the location of the mobile device 710 more accurately based on the measured information, the second magnetic field maps, and the moving pattern.

In operation 765, the server 720 returns the estimated location of the mobile device 710 to the mobile device 710.

Figure 8:
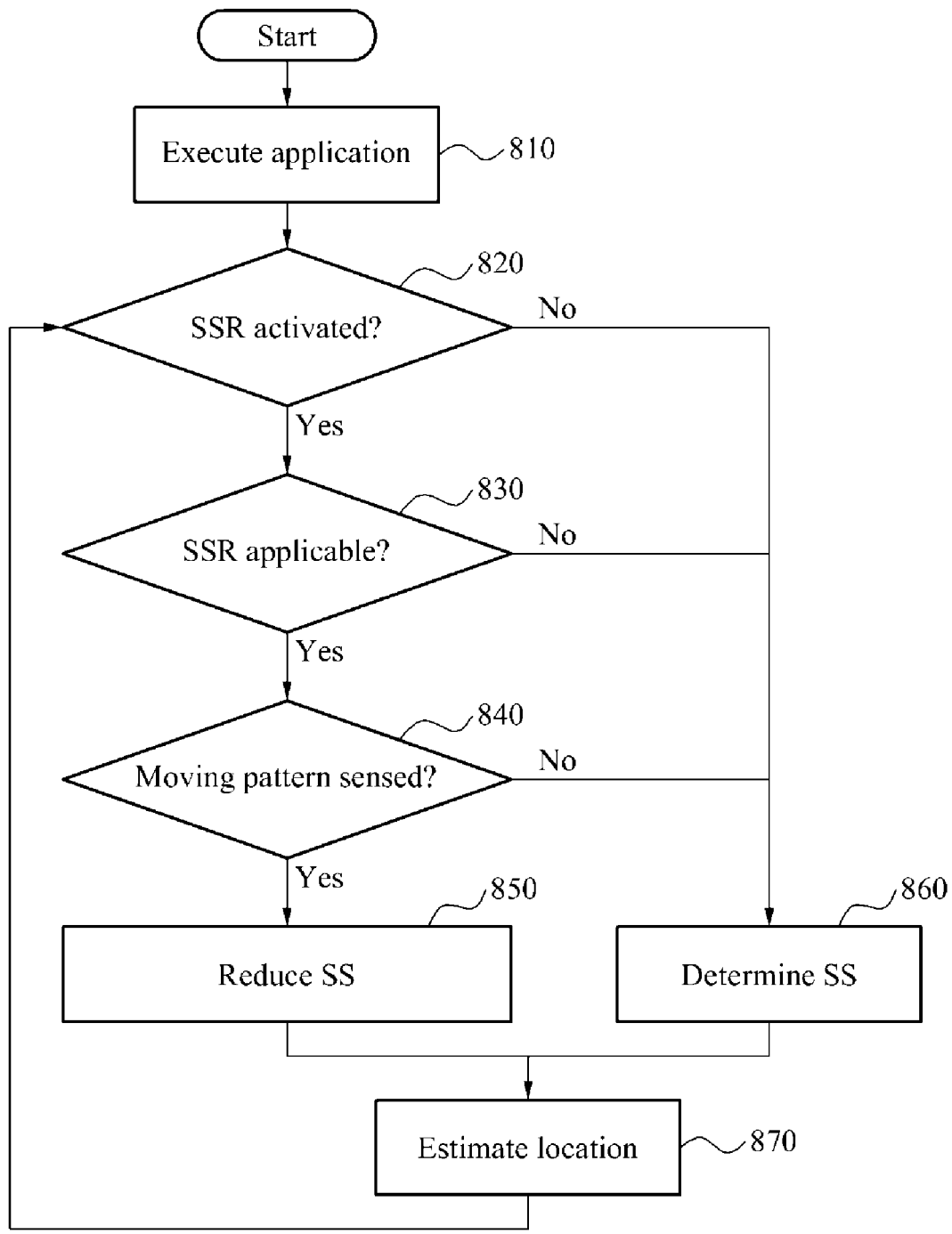
FIG. 8 is a flowchart illustrating an example of a method of estimating a location based on a magnetic field map and a moving pattern.

FIG. 8 illustrates an example of a method of estimating a location based on a magnetic field map and a moving pattern. Referring to FIG. 8, in operation 810, a mobile device executes an application that estimates the location.

In operation 820, the mobile device determines whether a search space reduction (SSR) function is activated. That is, the mobile device determines whether a moving pattern of the mobile device is to be considered to estimate the location. The mobile device may provide a user of the mobile device with an interface to set whether the SSR function is to be activated when providing the user with a location estimation service. The SSR function may include a function of sensing a corner, stairs, an elevator, and/or other spaces known to one of ordinary skill in the art, which may be expressed by a predetermined moving pattern of the mobile device, among spaces to which the mobile device may move. In addition, the SSR function may include a function of sensing predetermined spaces related to a wireless signal being received. The predetermined spaces related to the wireless signal may include a change point of an AP providing WiFi, a cellular handover point, and/or other points known to one of ordinary skill in the art.

As described above, additional information sensed by, e.g., an IMU sensor, may be needed to calculate the moving pattern of the mobile device. When the SSR function is activated, a battery consumption may increase. Accordingly, the mobile device may omit the moving pattern of the mobile device from consideration when the SSR function is set to be inactivated.

When the SSR function is determined to be activated, the mobile device continues in operation 830. Otherwise, the mobile device continues in operation 860.

In operation 830, the mobile device determines whether the SSR function is applicable. The mobile device may determine whether the SSR function is applicable based on a floor plan stored in a memory. For example, the mobile device may analyze the floor plan stored in the memory to determine whether a feature point to which the SSR function is applicable exists. When the SSR function is determined to be applicable, the mobile device continues in operation 840. Otherwise, the mobile device continues in operation 860.

In operation 840, the mobile device determines whether a moving pattern of the mobile device is sensed, using, e.g., the IMU sensor. When the moving pattern is determined to be sensed, the mobile device continues in operation 850. Otherwise (e.g., when the moving pattern is determined to be not sensed after a predetermined period of time), the mobile device continues in operation 860.

In operation 850, the mobile device reduces a search space (SS) based on the corresponding moving pattern. The SS includes a space to be searched to estimate the location, and may include, for example, one or more particle distribution candidates for a particle filter. The mobile device may reduce the SS based on the floor plan.

In operation 860, the mobile device determines the SS without considering the moving pattern. The mobile device may determine the SS based on the floor plan.

In operation 870, the mobile device estimates the location of the mobile device based on the reduced SS or the determined SS.

Figure 9:
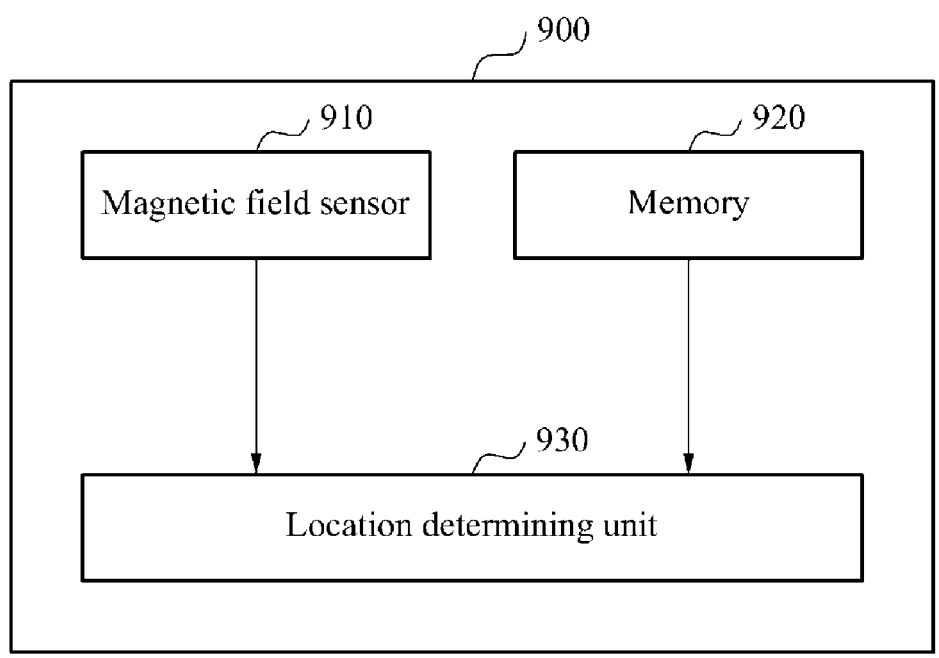
FIG. 9 is a block diagram illustrating an example of a mobile device that estimates a location based on at least two magnetic field maps.

FIG. 9 illustrates an example of a mobile device 900 that estimates a location based on at least two magnetic field maps. Referring to FIG. 9, the mobile device 900 includes a magnetic field sensor 910, a memory 920, and a location determining unit 930.

The magnetic field sensor 910 measures a magnetic field value at the location of the mobile device 900. The memory 920 stores a first magnetic field map including magnetic field values at respective points included in a first plane, and a second magnetic field map including magnetic field values at respective points included in a second plane. The first plane corresponds to a first height, the second plane corresponds to a second height, and the first height differs from the second height. The first height and the second height may refer to heights from the ground. Each of the first plane and the second plane may include a flat plane and/or a curved plane. When the ground is flat, the first plane and the second plane may include flat planes, respectively. When the ground is uneven, the first plane and the second plane may include curved planes, respectively. In addition, the first plane may be parallel to the second plane.

Figure 10:
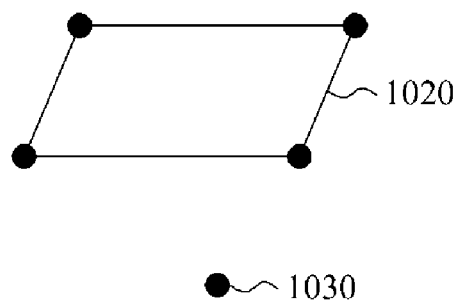
FIG. 10 is a diagram illustrating an example of an operation of a location determining unit that estimates a location based on at least two magnetic field maps.
Figure 10:
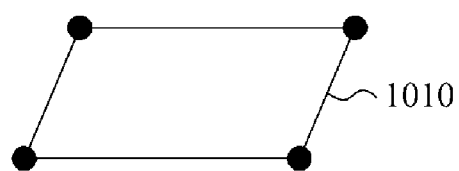

The location determining unit 930 determines the location of the mobile device 900 based on the magnetic field value measured by the magnetic field sensor 910, and the first and second magnetic field maps obtained from the memory 920, as described with further reference to FIG. 10

FIG. 10 illustrates an example of an operation of a location determining unit that estimates a location based on at least two magnetic field maps. Referring to FIGS. 9 and 10, the location determining unit 930 may include a particle value calculating unit (not shown) that calculates a magnetic field value of at least one particle 1030 based on a first magnetic field map 1010 and a second magnetic field map 1020. In this example, the at least one particle 1030 may be absent in the first magnetic field map 1010 and the second magnetic field map 1020.

For example, the particle value calculating unit may calculate the value of the at least one particle 1030 based on magnetic field values of at least eight respective points. For example, the calculation of the value of the at least one particle 1030 may include applying a 3D interpolation scheme to the at least eight points. The at least eight points may be included in the first magnetic field map 1010 or the second magnetic field map 1020.

The location determining unit 930 may further include a particle weight assigning unit (not shown) and a weighted location determining unit (not shown). The particle weight assigning unit assigns a weight to the at least one particle 1030 based on the measured magnetic field value and the value of the at least one particle 1030. The weighted location determining unit determines the location of the mobile device 900 based on the weight assigned to the at least one particle 1030.

For example, the location determining unit 930 may use a particle filer. The particle filter may distribute a particle at a location other than points included in the first magnetic field map and the second magnetic field map. The location determining unit 930 may calculate a value of the distributed particle, using the particle value calculating unit.

The location determining unit 930 may assign a weight to the distributed particle, using the particle weight assigning unit, based on the measured magnetic field value, and the value of the distributed particle. The location determining unit 930 may assign weights to particles positioned at the points included in the first magnetic field map and the second magnetic field map, in addition to the distributed particle, using the particle weight assigning unit. The location determining unit 930 may assign a higher weight to a particle relatively highly-related (e.g., including a magnetic field highly-close in value) to the measured magnetic field value than a particle relatively less-related to the measured magnetic field value.

In addition, the location determining unit 930 may assign a weight of 0 to a particle unrelated to the measured magnetic field value. As another example, the location determining unit 930 may extract particles related to the measured magnetic field value, and assign a weight to the extracted particles.

The location determining unit 930 may determine the location of the mobile device 900 based on a value of at least one particle assigned a weight other than 0 and the corresponding weight, using the weighted location determining unit. The location determining unit 930 may determine the location of the mobile device 900 so that the determined location of the mobile device 900 may be closer to a location of a particle to which a higher weight is applied, than a location of a particle to which a lower weight is applied.

In the description provided above, it is described that the first plane may be parallel to the second plane. However, the identical scheme may be applied to an example in which the first plane is not parallel to the second plane. In addition, a shape of the first plane may differ from a shape of the second plane. For example, if the first plane corresponds to a curved plane and the second plane corresponds to a flat plane, the identical scheme may be applied.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a device described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile device comprising:
    a sensor configured to measure a magnetic field value at a location of the mobile device;
    a memory configured to store first magnetic field maps corresponding to a number N of respective heights; and
    a processor configured to derive second magnetic field maps corresponding to a number M of respective heights based on the first magnetic field maps and to determine the location of the mobile device based on the magnetic field value and the second magnetic field maps,
    wherein the number M is greater than the number N.

2. The mobile device of claim 1, wherein the processor is further configured to obtain the first magnetic field maps from the memory and interpolate the first magnetic field maps to derive the second magnetic field maps.

3. The mobile device of claim 1, wherein the processor is further configured to determine the number M based on a resolution of the sensor.

4. The mobile device of claim 1, wherein the processor is further configured to generate a particle filter based on the second magnetic field maps and estimate the location of the mobile device based on the particle filter and the magnetic field value.

5. The mobile device of claim 1, wherein the processor is further configured to calculate a moving pattern of the mobile device and determine the location of the mobile device based on the magnetic field value, the second magnetic field maps, and the moving pattern.

6. The mobile device of claim 5, further comprising:
    an inertial measurement unit (IMU) sensor configured to measure an acceleration and a gyro of the mobile device,
    wherein the processor is further configured to calculate the moving pattern based on the acceleration and the gyro.

7. The mobile device of claim 6, wherein the gyro comprises a rotation and/or an orientation of the mobile device.

8. The mobile device of claim 5, wherein:
    the memory is further configured to store a floor plan of the first magnetic field maps; and
    the processor is further configured to generate a particle filter based on the second magnetic field maps, determine a particle distribution candidate for the particle filter, based on the moving pattern and the floor plan, and estimate the location of the mobile device based on the particle filter, the particle distribution candidate, and the magnetic field value.

9. A method comprising:
    obtaining first magnetic field maps corresponding to a number N of respective heights; and
    deriving second magnetic field maps corresponding to a number M of respective heights based on the first magnetic field maps, the number M being greater than the number N,
    wherein the second magnetic field maps are used to determine a location of a mobile device.

10. The method of claim 9, wherein the deriving comprises:
    interpolating the first magnetic field maps to derive the second magnetic field maps.

11. The method of claim 9, wherein the deriving comprises:
    determining the number M based on a resolution of a sensor that measures a magnetic field value at the location of the mobile device.

12. The method of claim 9, further comprising:
    obtaining a magnetic field value at the location of the mobile device;
    generating a particle filter based on the second magnetic field maps; and
    estimating the location of the mobile device based on the particle filter and the magnetic field value.

13. The method of claim 9, further comprising:
    obtaining a magnetic field value at the location of the mobile device;
    obtaining an acceleration and a gyro of the mobile device;
    calculating a moving pattern of the mobile device based on the acceleration and the gyro; and
    determining the location of the mobile device based on the magnetic field value, the second magnetic field maps, and the moving pattern.

14. The method of claim 13, wherein the determining comprises:
    obtaining a floor plan of the first magnetic field maps;
    generating a particle filter based on the second magnetic field maps;
    determining a particle distribution candidate for the particle filter, based on the moving pattern and the floor plan; and
    estimating the location of the mobile device based on the particle filter, the particle distribution candidate, and the magnetic field value.

15. A non-transitory computer-readable medium storing a program comprising instructions to cause a computer to perform the method of claim 9.

* * * * *